June 24, 1941. R. A. SCHULTZ 2,247,137
FRONT WHEEL DRIVE ASSEMBLY
Filed Aug. 15, 1938 3 Sheets-Sheet 1
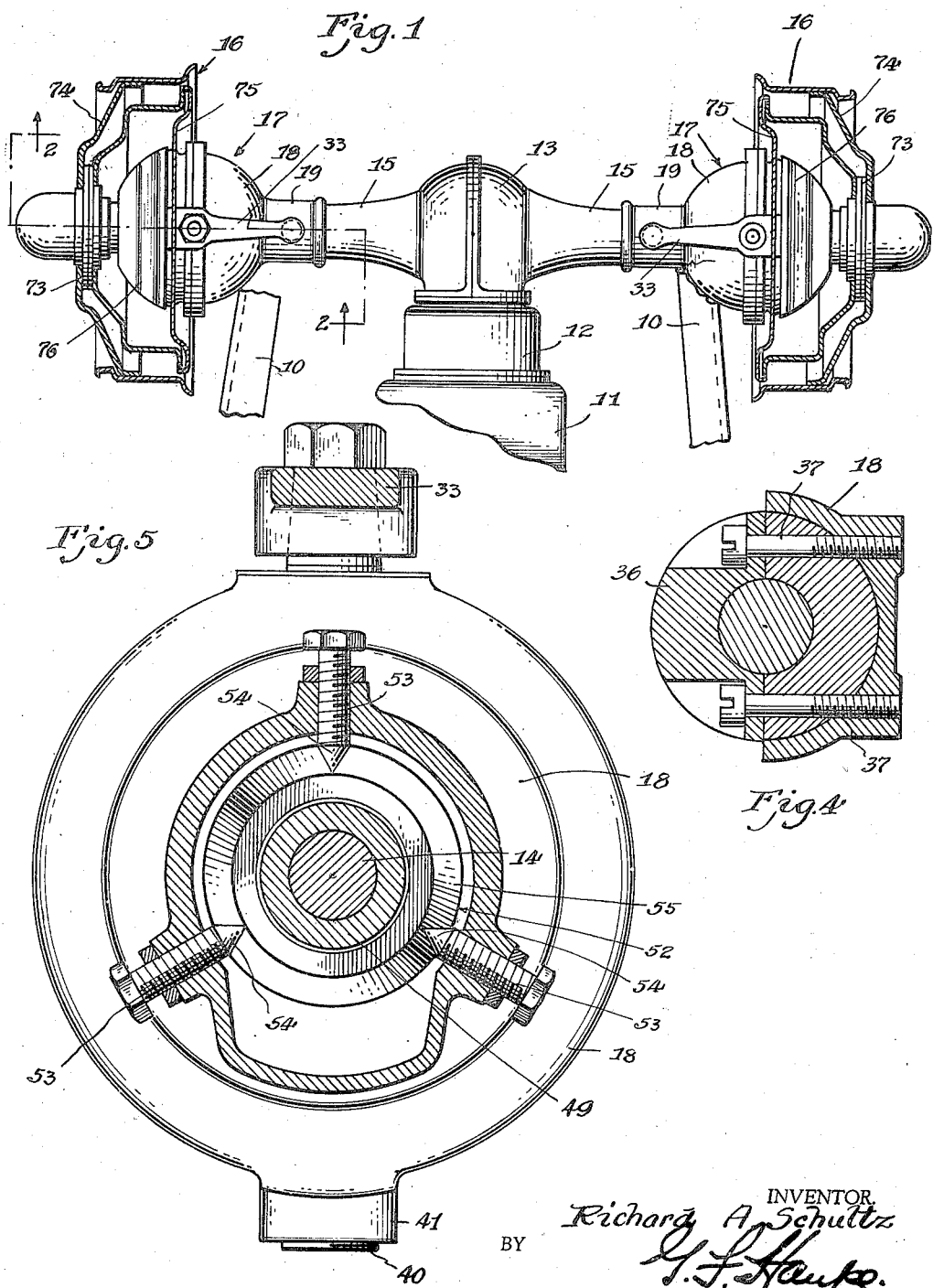
INVENTOR.
Richard A. Schultz
BY
G. F. Hauke.
ATTORNEY.

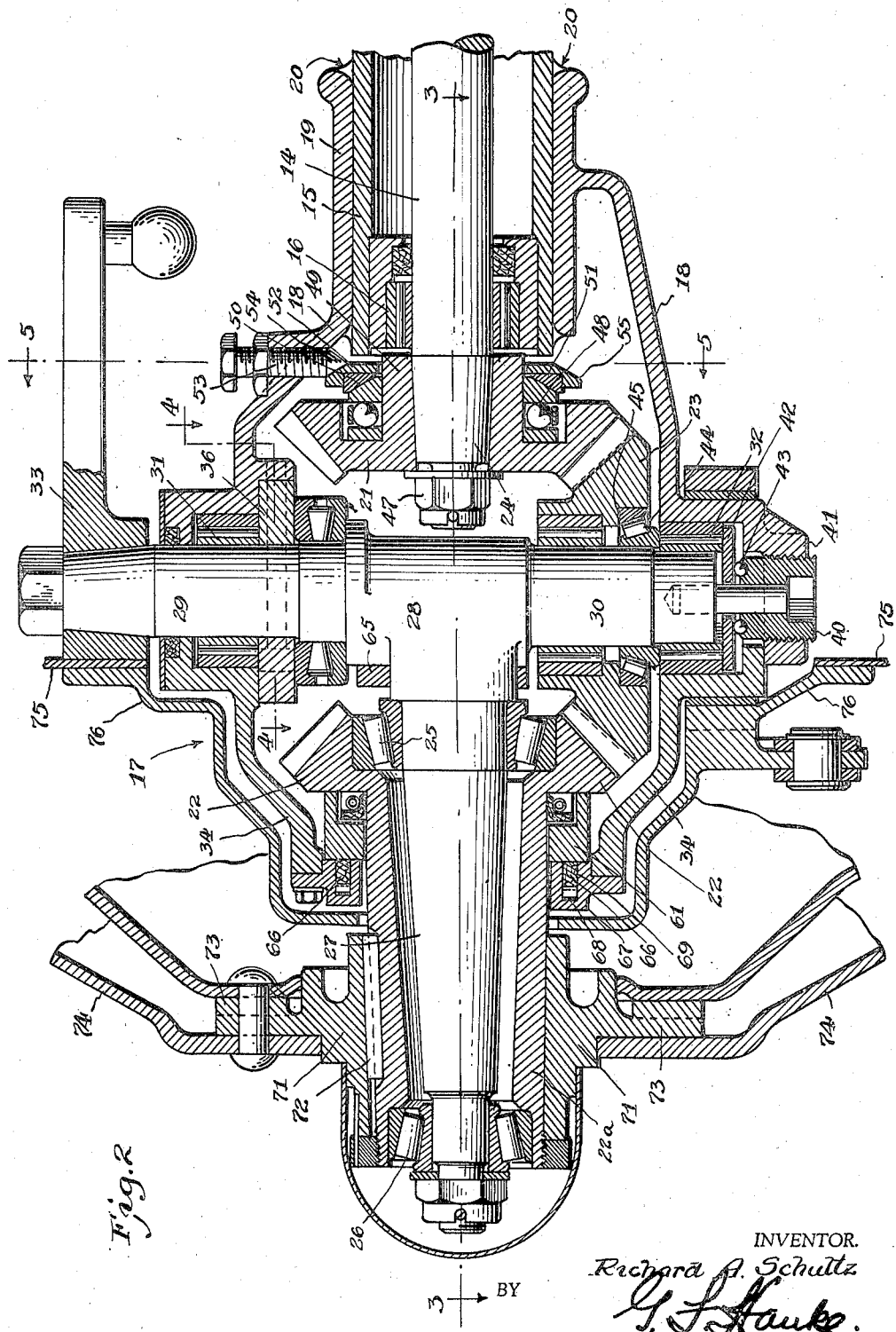

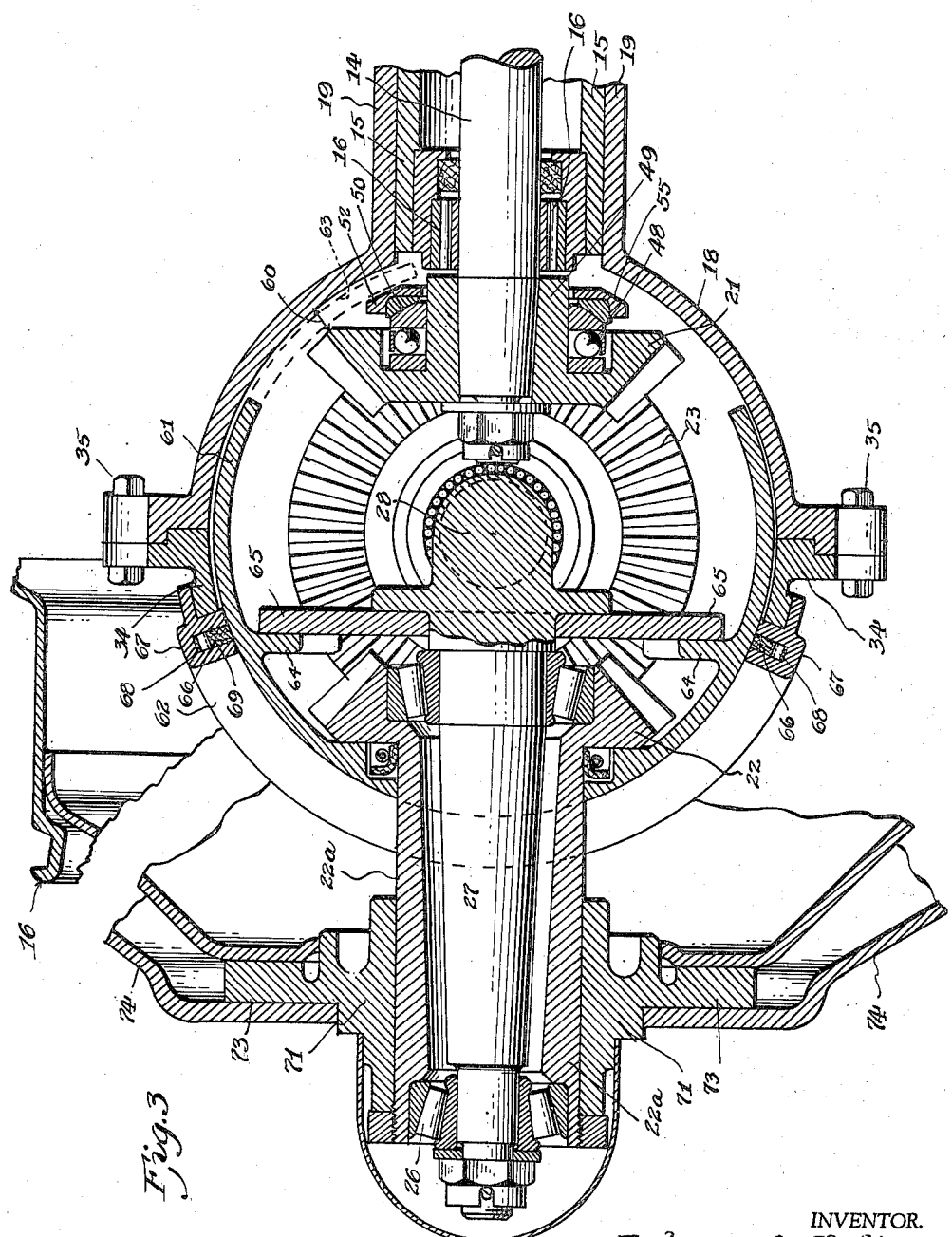

Patented June 24, 1941

2,247,137

UNITED STATES PATENT OFFICE 2,247,137

FRONT WHEEL DRIVE ASSEMBLY

Richard A. Schultz, Roseville, Mich., assignor, by mesne assignments, to Friend Motor Company, St. Clair Shores, Mich., a corporation of Michigan Application August 15, 1938, Serial No. 224,923

20 Claims. (Cl. 180—43)

My invention relates to a front wheel drive assembly and more particularly to the universal front wheel gear driving mechanism for transmitting the power from the drive axle to the front steering wheels of a vehicle.

The present invention may be utilized in any type of power driven vehicle, but is more particularly applicable for trucks and buses and is therefore constructed very rugged in order to stand up under the constant heavy loads to which such vehicles are usually subjected.

It is an object of my present invention to provide a structure of the character described which can be economically manufactured and which is so constructed and arranged as to facilitate servicing and maintenance of the unit.

Another object of the present invention is to provide a practical solution to the front wheel drive problem by constructing my front wheel drive assembly in such a way as to facilitate ready adjustment of the gearing, such adjustment facilitating assembly as well as servicing of the unit.

A further object of my present invention is to provide an improved front wheel drive assembly constructed and arranged to provide for a maximum turning radius which permits the turning of said wheels through a greater arc than has heretofore been possible.

A further object of my invention is to provide a simplified construction which is more economical and practical to manufacture by providing a construction in which the various component parts of the gearing are independently supported and also independently adjusted, and to further provide means for dis-assembly without disturbing the gear adjustment, this arrangement comprising means for removing the gear housing cover and wheel hub, driven gear and idler gear carried by said spindle without disturbing the adjustment of the remaining portions of the mechanism.

It is a still further object of my invention to provide various improved structural improvements, particularly, adapted for use with a front wheel drive assembly as will be more apparent from the following detailed description of the invention.

For a more detailed understanding of my invention, reference may be had to the accompanying drawings illustrating preferred embodiments of the invention, and in which:

Fig. 1 is a plan view partly in section of the forward end of a vehicle illustrating my improved front wheel drive assembly associated therewith.

Fig. 2 is a vertical sectional view through the front wheel drive assembly taken on the line 2—2 of Fig. 1, Fig. 3 is a plan sectional view of the front wheel drive assembly taken substantially on the line 3—3 of Fig. 2, and Figs. 4 and 5 are detailed sectional views taken substantially on the lines 4—4 and 5—5 of Fig. 2.

My improved front wheel drive construction is particularly adapted to be associated with a vehicle of the standard construction, which vehicle includes in general a chassis frame 10 on which is supported in the usual manner, an engine 11 which carries a transmission and clutch assembly 12, the drive from the engine operating through a standard differential 13 and driving the axle 14 mounted or supported internally of the axle housing 15 by suitable main bearings 16.

The drive from the axle 14 is conveyed to the wheels 74 through my improved front wheel drive gear assembly noted as a whole by the reference character 17. My improved front wheel drive assembly comprises in general a gear housing 18 provided with an extension 19 which telescopes over the axle housing 15 and is preferably welded thereto as at 20, this gear housing 18 being thereby permanently united with the axle housing. A bevelled driving gear 21 is operable to drive the driven gear 22 through an intermediate bevelled idler gear 23. Said driving gear 21 is mounted on the end of the axle as at 24 while the driven gear 22 is mounted on bearings 25 and 26 carried by the lateral projecting extension 27 of the spindle 28. This spindle 28 has the arms 29 and 30 extending upwardly and downwardly and supported in bearings 31 and 32 respectively which are carried by the gear housing 18. The arm 29 is extended and has secured thereto a steering arm 33. A gear housing cover 34 is secured to the gear housing 18 by being bolted thereto in the usual manner as at 35. A clamp ring or bracket 36 is bolted to the gear housing 18 by means of bolts 37 and serves to fasten the spindle 28 to the gear housing 18 independently of the gear housing cover so that when the gear housing cover is removed the adjustment of the spindle and the gearing is not disturbed, thereby permitting ready access to be had to the interior of the structure without dismantling the whole assembly.

It will be noted that the spindle 28 and the driven gear 22 are stationarily located and the adjustment of the gearing is had by adjusting the idler gear 23 and the driving gear 21 so as to at all times maintain accurate operating clearances between said gears. The adjustment of the idler gear is made possible by adjusting the screw 40 carried in a boss or ear 41 integrally formed with the gear housing 18. This screw 40 bears upon a thrust plate 42 through the balls 43 and acts through the bearings 32 upon a thrust bearing 44, which, in turn, thrusts against the idler gear shoulder 45 and thus the idler gear may be adjusted relative to the driven gear 22 since said idler gear is capable of sliding on the arm 39 of the spindle. Obviously also, the adjustment of the idler gear is had relative to the driving gear 21 as well.

The adjustment of the driving gear is had in a novel manner. It will be noted that the driving gear 21 is fixed to the tapered shank portion of the axle 14 by means of a hold down nut 47. A thrust bearing 48 is carried on the shank 49 of the bevelled driving gear 21 and the said thrust bearing is provided with a spherical thrust face 50 engaging the spherical face of the thrust ring 51 which in turn engages the adjusting collar 52. A plurality of adjusting screws 53, preferably three in number, are mounted in the gear housing 18 and have bevelled engaging portions 54 which engage the bevelled face 55 of the adjusting collar 52. Thus the driving gear 21 may be moved toward the idler gear 23 to take up wear since the axle 14 is splined into the differential in the usual way and is permitted to slide longitudinally within the axle housing 15. Any inaccuracies in the adjustment of these adjusting screws are compensated for by the construction of the self-aligning bearing structure positioned between the adjusting screws and the thrust bearing 48.

It will be noted that the driving gear 21 is supported within the gear housing in spaced relation with respect to the housing as clearly shown in Fig. 3 in such a way as to provide a space 60 behind said driving gear for permitting the flange 61 which serves as a grease plate for closing the opening 62 in the housing cover, to move into a position behind the driving gear as shown by the dotted line position 63. In this way my construction makes possible the rotation of the steering spindle through an arc of approximately 45° from the axis of the axle, thereby providing a maximum turning radius which is substantially greater than heretofore made possible by prior front wheel drive assemblies. The grease plate 61 is constructed substantially cylindrical in contour and is telescoped within the gear housing and cover as clearly shown in Fig. 3. This plate is provided with an internal flange 64 engaging a plate 65 carried by the spindle 28 and serves to close the opening 62 in the gear housing cover 34, which opening is elongated and constructed to permit lateral movement of the spindle extension 27 and driven gear hub 22a. Means are provided for sealing the opening and comprise a packing or sealing element 66 which is carried by a molding frame 67 secured about the peripheral edge of the opening, a corrugated spring element 68 being interposed in the recesses 69 carried by this molding frame 67 and which acts to urge the packing 66 into engagement with the grease plate 61.

The driven gear 22 has an outwardly extending shank or hub 22a which projects through this opening and is carried on the bearing 26 mounted on the extreme end of the spindle extension 27. A wheel hub 71 is mounted on the hub 22a and is keyed thereto as at 72, said hub having the usual hub flange 73 for carrying the wheel 74.

The wheel brake cover plate 75 is carried or secured to the steering arm 33 as shown in Fig. 2 as well as is the dust cover plate 76.

It will thus be seen that I have provided a very simple front wheel drive assembly which is economically manufactured and which does not readily get out of adjustment. Also, it will be noted that improved means are provided for readily adjusting the internal gearing without dismantling the assembly, thereby facilitating servicing of such units.

It will be apparent to those skilled in the art to which my invention pertains that various modifications and changes may be made therein without departing from the spirit of my invention or from the scope of the appended claims.

I claim:

1. In a front wheel drive assembly constructed and arranged for operative assembly with a drive axle, an axle housing, a gear housing permanently secured to said axle housing, a drive assembly supported by said gear housing and including gearing and a spindle, said gearing including a driving gear secured to the drive axle, a driven gear supported by said spindle and drivingly connected with a wheel hub, and an idler gear intermediate and meshing with said driving and driven gears, means carried by said gear housing for adjustably positioning said idler gear relative to said driving and driven gears, said spindle, driven gear and idler gear being supported for removal as a unit independently of said driving gear and said idler gear adjustment, said driving gear removable as a unit with said drive axle.

2. A front wheel drive assembly comprising an axle, an axle housing, a fixed bearing carried by said housing for supporting said axle, a driving gear secured to said axle, a gear housing, intermediate gearing supported by said housing, and adjusting means operable to adjust said driving gear relative to said intermediate gearing independently of said fixed bearing.

3. A front wheel drive assembly comprising an axle, an axle housing, a fixed bearing carried by said housing for supporting said axle, a driving gear secured to said axle, a gear housing, intermediate gearing supported by said housing, and adjusting means carried by said gear housing and operable to adjust said driving gear and axle relative to said intermediate gearing independently of said fixed bearing.

4. A front wheel drive assembly comprising an axle, a driving gear secured to said axle, a gear housing, intermediate gearing supported by said housing, and adjusting means including a plurality of adjusting screws carried by said gear housing and operable to adjust said driving gear relative to said intermediate gearing, and a self-aligning bearing means disposed intermediate said screws and driving gear whereby to compensate for inaccurate adjustment of said adjusting screws.

5. A front wheel drive assembly including a drive axle, a driving gear secured to said axle, an axle housing, a gear housing permanently secured to said axle housing, said axle housing carrying a fixed bearing for supporting said axle, and a thrust bearing backing up said driving gear and adjustable independently of said fixed axle bearing.

6. A front wheel drive assembly including an axle housing, an axle, a fixed bearing carried by said axle housing for supporting said axle, a gear housing secured to said axle housing a spindle supported by said gear housing, a bevelled driving gear carried by said axle, a bevelled driven gear carried by said spindle, a bevelled idler gear carried by an extension of said spindle and axially aligned with the pivotal axis of said spindle, said idler gear meshing with said driving and driven gears, means adjusting said idler gear relative to said driving and driven gears, and means engaging said driving gear for adjusting said driving gear relative to said idler gear and independently of said fixed bearing.

7. A front wheel drive assembly comprising a driving axle shaft, an axle housing, a fixed bearing carried by said housing for supporting said axle shaft, a stationary housing, a spindle pivotally supported by said housing and carrying a driven gear, an idler gear adjustably carried by said spindle and drivingly connected with said driven gear, and a driving gear carried by said axle shaft, and adjustable means engaging the driving gear and operable to adjust said driving gear relative to said idler gear independently of said fixed bearing.

8. A front wheel drive assembly comprising an axle, a driving gear mounted on said axle, a spindle, an intermediate idler gear and a driven gear carried by said spindle, a gear housing for housing said gears and including a removable gear housing cover having an elongated opening through which said spindle and driven gear shank project and which permits lateral movement of same relative to said housing, a grease plate carried by said spindle for closing said opening, the rear face of said driving gear supported in spaced relation relative to the interior face of said housing and having sufficient clearance to permit movement of said grease plate into the space between the rear face of said driving gear and housing on turning said spindle through its maximum arc.

9. A front wheel drive assembly comprising a housing, a spindle pivotally supported by said housing and carrying a driven gear and a grease plate, driving and intermediate gearing supported within said housing, said driving gear having a hub, and means carried on said driving gear hub adjustably supporting and positioning said driving gear in spaced relation relative to said housing, said means also positioned to provide clearance for said grease plate and permit lateral movement thereof into said clearance zone through an arc of substantially forty-five degrees from a position aligned with the axis of said driving gear.

10. A front wheel drive assembly comprising a stationary housing, a spindle pivotally supported by said housing, and a removable bearing structure secured to said housing for supporting said spindle, said spindle supporting driven and intermediate gearing, and a housing cover enclosing some of said gearing and removably secured to said housing and arranged for disassembly therewith without removing any of said internal gearing, thereby providing for ready access to all said gearing.

11. A front wheel drive assembly including a gear housing, gearing therein including a spindle and an intermediate idler gear, a bearing carried by the spindle for supporting said idler gear, a boss carried by said housing and overlying the end of the spindle, a spindle bearing slidably supported by said housing and constructed to abut the idler gear bearing aforesaid, and adjustment means adjustably carried by said boss in engagement with the spindle bearing and operable to adjust said idler gear from without the housing relative to the other gear members.

12. A front wheel drive assembly including an axle, an axle housing and a gear housing comprising a pair of complementary housing structures, one of said housing structures fixed to the axle housing, a spindle supported by said fixed housing structure, a driving gear carried by said axle, a driven gear and an idler gear supported by said spindle, said other housing structure removably secured to said spindle and having relative swinging movement with respect to said fixed housing structure, and means supported by said fixed housing structure for adjustably positioning said driving gear and said idler gear, said removable housing structure constructed and arranged for absolute removal from the assembly independently of said gearing, and said adjustably supports therefor, said drive mechanism thereby remaining operable and exposed to permit ready access to be had thereto and exposed for unobstructed observation in operation under various adjustments.

13. A front wheel drive assembly including an axle, an axle housing and a gear housing comprising a pair of complementary housing structures, one of said housing structures fixed to the axle housing, a spindle supported by said fixed housing structure, a driving gear carried by said axle, a driven gear and an idler gear supported by said spindle, said other housing structure removably secured to said spindle and having relative swinging movement with respect to said fixed housing structure, and means supported by said fixed housing structure for adjustably positioning said driving gear and said idler gear, said removable housing structure constructed and arranged for absolute removal from the assembly independently of said gearing, and said adjustable supports therefor, said drive mechanism thereby remaining operable and exposed to permit ready access to be had thereto and exposed for unobstructed observation in operation under various adjustments, said fixed housing structure terminating substantially in a plane containing the axis of the spindle and which extends substantially normal to the axle axis.

14. A front wheel drive assembly including an axle, an axle housing and a gear housing comprising a pair of complementary housing structures, one of said housing structures fixed to the axle housing, a spindle supported by said fixed housing structure, a driving gear carried by said axle, a driven gear and an idler gear supported by said spindle, said other housing structure removably secured to said spindle and having relative swinging movement with respect to said fixed housing structure, and means supported by said fixed housing structure for adjustably positioning said driving gear and said idler gear, said removable housing structure constructed and arranged for absolute removal from the assembly independently of said gearing, and said adjustable supports therefor, said drive mechanism thereby remaining operable and exposed to permit ready access to be had thereto and exposed for unobstructed observation in operation under various adjustments, said means adjustably positioning the driving and idler gears being constructed and arranged to be actuated during operation of said gearing.

15. A front wheel drive including an axle housing, a gear housing rigidly secured to said axle housing, driving mechanism substantially enclosed within said gear housing and including a driving gear, an idler gear and a spindle pivotally and solely supported by said gear housing and adapted for supporting a wheel hub driven by said gearing, and a gear housing cover having an opening through which said spindle projects, and additional securing means removably securing said cover to said gear housing permitting removal of said cover without disturbing the adjustment of said gearing housed and supported within said gear housing.

16. A front wheel drive including a gear housing, gearing housed therein and supported thereby and including a driving gear, an idler gear and a spindle pivotally supported by said housing, a gear housing cover removably secured to said gear housing and having an opening through which said spindle projects and arranged for relative movement therewith, said cover being removed outwardly over said spindle.

17. A front wheel drive including an axle housing and a gear housing rigidly secured to said axle housing, gearing housed therein and supported thereby and including a driving gear, an idler gear and a spindle pivotally supported by said housing, a gear housing cover removably secured to said gear housing and having an opening through which said spindle projects, said opening being elongated to permit swinging movement of said spindle, a wheel hub supported by said spindle and including a flange for masking the opening in said cover, said housing cover being removable without disturbing the adjustment of said idler gear relative to the driving gear.

18. A front wheel drive assembly comprising a driving axle shaft, an axle housing, a main bearing carried by said housing for supporting said axle shaft, a stationary housing secured to said axle housing, a spindle pivotally supported by said housing and carrying a driven gear, an idler gear adjustably carried by said spindle and drivingly connected with said driven gear, and a driving gear carried by said axle shaft, and adjustable means operable independently of said main bearing to adjust said driving gear relative to said idler gear and including manually actuated means for adjusting said gear from without said housing.

19. A front wheel drive assembly including an axle, an axle housing and a gear housing comprising complementary gear housing structures, gearing within said housing and including a driving gear secured to said axle, one of said housing structures fixed to the axle housing, an axle main bearing located substantially at the end of the axle housing adjacent to the said fixed housing structure, and means adjustably positioning said driving gear relative to said other gears of said gearing assembly and including a thrust bearing relatively movable with respect to said axle main bearing and adjustable means operable to engage said thrust bearing to move same whereby to adjust said driving gear relative to said other gears.

20. A front wheel drive assembly including an axle, an axle housing and a gear housing comprising complementary gear housing structures, gearing within said housing and including a driving gear secured to said axle, one of said housing structures fixed to the axle housing, an axle main bearing located substantially at the end of the axle housing adjacent to the said fixed housing structure, and means adjustably positioning said driving gear relative to said other gears of said gearing assembly and including a thrust bearing relatively movable with respect to said axle main bearing and adjustable means operable to engage said thrust bearing to move same whereby to adjust said driving gear relative to said other gears, said fixed housing having a tubular extension engaging around the axle housing portion carrying said main axle bearing.

RICHARD A. SCHULTZ.